United States Patent [19]

Yokota

[11] Patent Number: 5,745,454
[45] Date of Patent: Apr. 28, 1998

[54] RECORDING MEDIUM HAVING TEXT INFORMATION RECORDED THEREON AND REPRODUCING APPARATUS

[75] Inventor: Teppei Yokota, Chiba, Japan

[73] Assignee: Sony Corporation, Tokyo, Japan

[21] Appl. No.: 716,953

[22] Filed: Sep. 20, 1996

[30] Foreign Application Priority Data

Sep. 22, 1995 [JP] Japan ................................. 7-244959

[51] Int. Cl.⁶ ..................................................... G11B 7/00
[52] U.S. Cl. ............................................... 369/48; 369/58
[58] Field of Search ................................. 369/48, 47, 59, 369/124, 49, 53, 56, 50, 13, 32, 54, 275.3; 358/335, 342

[56] References Cited

U.S. PATENT DOCUMENTS

| | | | |
|---|---|---|---|
| 5,010,417 | 4/1991 | Yoshio et al. | 358/335 |
| 5,268,889 | 12/1993 | Furukawa et al. | 369/47 |
| 5,280,572 | 1/1994 | Case et al. | 395/144 |
| 5,282,186 | 1/1994 | Yoshio et al. | 369/48 |
| 5,465,244 | 11/1995 | Kobayashi et al. | 369/50 |
| 5,619,483 | 4/1997 | Yokota et al. | 369/47 |
| 5,625,611 | 4/1997 | Yokota et al. | 369/47 |

*Primary Examiner*—Ali Neyzari
*Attorney, Agent, or Firm*—Limbach & Limbach L.L.P.

[57] ABSTRACT

A recording medium in which the subcode is recorded in association with main data, and a reproducing apparatus for reproducing the recording medium. On the disc-shaped recording medium, there is provided a management area suitable for coding and recording the letter information for displaying the letter information capable of coping with the program information recorded in the program area or the letter information specifying the types or the classification of the disc-shaped recording medium. In addition, when reproducing the disc-shaped recording medium, it is discerned whether the TEXT data or the graphics information is to be decoded on the basis of the mode information provided in the management area of the disc-shaped recording medium, and a decoding circuit is switched based on the discriminated result for selecting the display in order to cope with various different disc-shaped recording media.

20 Claims, 17 Drawing Sheets

|  | P | Q | R | S | T | U | V | W |
|---|---|---|---|---|---|---|---|---|
| FRAME F01 | S0 ||||||||
| FRAME F02 | S1 ||||||||
| FRAME F03 | P01 | Q01 | R01 | S01 | T01 | U01 | V01 | W01 |
| FRAME F04 | P02 | Q02 | R02 | S02 | T02 | U02 | V02 | W02 |
| ⋮ | ⋮ | ⋮ | ⋮ | ⋮ | ⋮ | ⋮ | ⋮ | ⋮ |
| FRAME F95 | P93 | Q93 | R93 | S93 | T93 | U93 | V93 | W93 |
| FRAME F96 | P94 | Q94 | R94 | S94 | T94 | U94 | V94 | W94 |
| FRAME F97 | P95 | Q95 | R95 | S95 | T95 | U95 | V95 | W95 |
| FRAME F98 | P96 | Q96 | R96 | S96 | T96 | U96 | V96 | W96 |

| ID1 | CONTENTS OF IDENTIFICATION |
|---|---|
| 80h | SIZE |
| 81h | DISC ID |
| 82h | GENRE CODE |
| 83h | RESERVED |
| 84h | RESERVED |
| 85h | TITLE OF ALBUM |
| 86h | TITLE OF MUSIC |
| 87h | NAME OF ARTIST |
| 88h | NAME OF CONDUCTOR |
| 89h | NAME OF GROUP (OF ORCHESTRA) |
| 8bh | NAME OF COMPOSER |
| 8ch | NAME OF SONGWRITER |
| 8dh | NAME OF ARRANGER |
| 8c | NAME OF SONGWRITER |
| 8d | NAME OF ARRANGER |

FIG.13

| MSB | s1 | LSB | MSB | s2 | LSB |
|---|---|---|---|---|---|
| RESERVED | MULTI LINGUAL | | TOTAL PACK NUMBER | | MAX=4096PACKS |

| MSB | s3 | LSB | MSB | s4 | LSB |
|---|---|---|---|---|---|
| TOTAL PACK NUMBER OF ALBUM TITLE | | | TOTAL PACK NUMBER OF MUSIC TITLE | | |

| MSB | s5 | LSB | MSB | s6 | LSB |
|---|---|---|---|---|---|
| TOTAL PACK NUMBER OF ARTIST NAME | | | TOTAL PACK NUMBER OF CONDUCTOR NAME | | |

| MSB | s7 | LSB | MSB | s8 | LSB |
|---|---|---|---|---|---|
| TOTAL PACK NUMBER OF GROUP NAME | | | TOTAL PACK NUMBER OF COMPOSER NAME | | |

| MSB | s9 | LSB | MSB | s10 | LSB |
|---|---|---|---|---|---|
| TOTAL PACK NUMBER OF SONGWRITER NAME | | | TOTAL PACK NUMBER OF ARRANGER NAME | | |

| MSB | s11 | LSB | MSB | s12 | LSB |
|---|---|---|---|---|---|
| TOTAL PACK NUMBER OF DISC ID | | | TOTAL PACK NUMBER OF ID=83h | | |

| MSB | s13 | LSB | MSB | s14 | LSB |
|---|---|---|---|---|---|
| TOTAL PACK NUMBER OF ID=84h | | | RESERVED | | |

FIG.18

| ID1 | ID2 | ID3 | ID4 | Text1 | Text2 | Text3 | Text4 | Text5 | Text6 | Text7 | Text8 | Text9 | Text10 | Text11 | Text12 | CRC | CRC |
|---|---|---|---|---|---|---|---|---|---|---|---|---|---|---|---|---|---|
| 86h | 01h | 00h | 00h | 17h | 01h | B | A | D | 00h | 17h | 02h | T | H | E | SP | | |

| ID1 | ID2 | ID3 | ID4 | Text1 | Text2 | Text3 | Text4 | Text5 | Text6 | Text7 | Text8 | Text9 | Text10 | Text11 | Text12 | CRC | CRC |
|---|---|---|---|---|---|---|---|---|---|---|---|---|---|---|---|---|---|
| 86h | 02h | 04h | 01h | W | A | Y | SP | Y | O | U | SP | M | A | K | E | | |

| ID1 | ID2 | ID3 | ID4 | Text1 | Text2 | Text3 | Text4 | Text5 | Text6 | Text7 | Text8 | Text9 | Text10 | Text11 | Text12 | CRC | CRC |
|---|---|---|---|---|---|---|---|---|---|---|---|---|---|---|---|---|---|
| 86h | 02h | 10h | 02h | SP | M | E | SP | F | E | E | L | 00h | 17h | 03h | S | | |

| ID1 | ID2 | ID3 | ID4 | Text1 | Text2 | Text3 | Text4 | Text5 | Text6 | Text7 | Text8 | Text9 | Text10 | Text11 | Text12 | CRC | CRC |
|---|---|---|---|---|---|---|---|---|---|---|---|---|---|---|---|---|---|
| 86h | 02h | 03h | 03h | P | E | E | D | SP | D | E | M | O | N | 00h | 17h | | |

| ID1 | ID2 | ID3 | ID4 | Text1 | Text2 | Text3 | Text4 | Text5 | Text6 | Text7 | Text8 | Text9 |
|---|---|---|---|---|---|---|---|---|---|---|---|---|
| 86h | 04h | 00h | 04h | L | I | B | E | R | I | A | N | |

FIG.20

RECORDING MEDIUM HAVING TEXT INFORMATION RECORDED THEREON AND REPRODUCING APPARATUS

BACKGROUND OF THE INVENTION

1. Field of the Invention

This invention relates to a recording medium having the sub-code recorded thereon in association with main data, and a reproducing apparatus for reproducing the recording medium.

2. Description of the Related Art

In a compact disc reproducing apparatus for reproducing a disc-shaped recording medium, having the audio information recorded thereon, that is a compact disc (CD), various sorts of display are made on the basis of the disc management information for assisting the user in reproducing the disc.

It has been practiced to reproduce and display the program number, or a so-called track number, or the time information allocated to each track number, recorded under mode 1 in a Q-channel subcode, as later explained, as the display information based on the disc management information.

An illustrative optical disc, such as CD, is shown in FIG. 1.

Referring to FIG. 1, an optical disc 101 has a center aperture 102, and a lead-in area 103, operating as a table-of-contents area or the program management area, a program area 104 having program data recorded therein, and a lead-out area 105 or a program end area, formed extending from the inner rim towards the outer rim of the optical disc 101. If the disc is an optical disc for audio data, having the audio information recorded thereon, the audio data is recorded in the program area 104, while the management information, such as the time information for the audio data, is recorded in the program management area 103. When the readout of the audio data from the program area 104 by the CD reproducing apparatus comes to a close, and the optical pickup has reached the lead-out area 105, the CD reproducing apparatus completes the reproducing operation of the optical disc for audio data.

FIG. 2 shows an illustrative CD reproducing apparatus.

In this figure, a pickup 112 of the CD reproducing apparatus detects signals recorded on the optical disc for audio data 101, based on the light reflected from the optical disc 101, for generating RF signals as playback signals, and focusing error signals and tracking error signals as error signals. The generated RF signals are sent to an analog waveform shaping circuit 114, while the focusing servo error signals are supplied to a focusing servo circuit 120 and the tracking servo error signal are supplied to a tracking and thread servo circuit 121.

The analog waveform shaping circuit 114 waveform-shapes the RF signals from the pickup 112 for converting the RF signals into bi-level signals. The digital bi-level signals, thus produced, are sent to a synchronization detection circuit 115 and a clock generating circuit 117. The clock generating circuit 117 generates playback clocks based on the digital bi-level signals from the waveshape forming circuit 114. The generated playback clocks are sent to the synchronization detection circuit 115, digital signal processing circuit 116 and to a rotation servo circuit 122. The synchronization detection circuit 115 detects the frame synchronization pattern from the digital signals, based on the playback clocks sent from the clock generating circuit 117, and sends the digital signal, from which the frame synchronization pattern has been detected, to the digital signal processing circuit 116.

The digital signal processing circuit 116 decodes the digital signals from the synchronization detection circuit 115, from which the frame synchronization signals have been detected, based on the playback clocks from the clock generating circuit 117 and reference clocks supplied from a quartz oscillator 119, and sends the decoded digital signals to a subcoding detection circuit 118, a D/A conversion circuit 123 and to a digital signal output terminal 125. The D/A (digital/analog) conversion circuit 123 converts the digital signal into analog signals which are sent to an audio amplifier 124. The audio amplifier 124 amplifies the analog audio signals from the D/A conversion circuit 123 and sends the amplified analog audio signals to an analog signal output terminal for the right channel and to an analog signal output terminal for the left channel.

The subcoding detection circuit 118 detects data of subcode P and Q channels as later explained from the digital signals of the digital signal processing circuit 116 and sends the detected subcode channel data to the tracking and thread servo circuit 121.

The focusing servo circuit 120 generates focusing driving signals, based on the focusing servo error signals from the pickup 112, and sends the focusing driving signals to the pickup 112 for controlling the focusing operation of the pickup 112. The rotation servo circuit 122 generates rotation control signals based on the playback clocks from the clock generator 117 and the reference clocks from the quartz oscillator 119 and sends the rotation control signals to the spindle motor 113 for controlling the rotation of the spindle motor 113.

The tracking and thread servo circuit 121 generates tracking control driving signals, based on the tracking servo error signal from the pickup 112, and sends the tracking control signals to the pickup 112. The tracking and thread servo circuit 121 also generates thread servo signals, based on the tracking servo error signal, and causes the pickup 112 in its entirety to be transported along the radius of the optical disc 101. The tracking and thread servo circuit 121 also generates tracking position control signals, based on data from the P and Q channels, and transports the pickup 112 along the radius of the disc 101, based on the track position control signals, for performing accessing control.

The subcode data and data of the P and Q channels will now be explained.

The signals recorded on the optical disc for audio data are sampled with the sampling frequency of 44.1 Khz, with each word being 16 bits long. The sampled 16-bit-per-word data is separated into upper 8 bits and lower 8 bits, each of the upper and lower 8 bits being a symbol. The error correction encoding and scrambling are performed on the symbol basis. The data, thus processed, are grouped into frames every four symbols. This frame corresponds to the original 12 samples, that is 6 left stereo samples and 6 right stereo samples.

FIG. 3 shows the format of the signals grouped into a sole frame. Each frame 135 is made up of a synchronization pattern data area 131 of 24 channel bits, a subcoding area 132 of 14 channel bits, a program data area 133 of 12-symbol program data D1 to data D12, each composed of 14 channel bits, 4-symbol parity data area 134, each composed of 14 channel bits, another program data area 133 and another parity data area 134. In addition, 3-channel-bit junction areas are provided for junctions of the areas or data portions. Therefore, each frame 135 is comprised of a sum total of 588 channel bits.

FIG. 4 shows 98 of the frames 135 grouped together and re-arrayed so that the respective areas and data portions of the frames are arrayed contiguously in the vertical direction. These 98 frames, grouped together, are also termed collectively as a frame. However, for distinction from the flame of 588 channel bits, the 98 frames, grouped together, as shown in FIG. 4, are sometimes termed a subcoding frame. This subcoding frame is made up of a frame synchronization pattern section 136, a subcoding section 137, and a data and parity section 138. Each subcoding frame corresponds to one-75th of a second of the usual CD playing time.

The sub-coding data, inclusive of P and Q channel data sent from the subcoding detection circuit 118, has been recorded in the subcoding unit 137 shown in FIG. 4. The subcoding unit 137 is of a structure in which 98 frames, namely frame F01 to frame F98, make up one block, that is a sub-coding frame, as shown in FIG. 5. The frames F01 and F02 represent block synchronization patterns and simultaneously out-of-rule patterns S0 and S1 of the 8–14 modulation system. The subcoding detection circuit 118 shown in FIG. 2 detects the synchronization pattern to form a sub-coding section 137 for one block. On the other hand, respective bits of the frames from F01 to F98 constitute channels from channel P to channel W. For example, the channel P is made up of portions of the patterns S0 and S1 and P01 to P98.

It is noted that data of 6 channels from channel R to channel W are used for still pictures or for special uses, such as for representing letters for karaoke. The P-channel and Q-channel data are used for controlling the accessing operations, for example, for controlling the pickup track positions.

In addition, since the time information for the number or the contents of programs is recorded in the subcode Q-channels, this information is displayed on, for example, a display device, such as an LCD display device, for assisting the user to visually recognize the program number of the program being played, play time elapsed or the absolute time since the start of reproduction.

In the above-described optical disc device, the user may feel like acquiring not only the program time information but also the information on the album name, performer, program name or the composer. In particular, an optical disc reproducing apparatus having a disc exchange function, that is designed to hold plural optical discs and to reproduce a desired one of the discs, has become widespread, such that it has become necessary to visually check which is the optical disc being reproduced. It is sometimes desirable that the program or the album name be displayed not only in an optical disc reproducing apparatus fitted with the disc exchange function but also in a usual optical disc reproducing apparatus.

However, since no letter information is included in the information recorded on the above-mentioned conventional optical disc, the title of the optical disc being reproduced or the program name being played cannot be displayed on the display device, such that it cannot be visually checked which of the optical discs is being displayed.

It is therefore contemplated to use a recording medium in the Q-channel of which is written the text information ancillary to the main data. However, because of the limitation of the number of letters, sufficient text information sometimes cannot be recorded in case the text information needs to be written in one CD in plural languages.

SUMMARY OF THE INVENTION

It is therefore an object of the present invention to provide a recording medium capable of recording a large quantity of the letter information that can be taken out without using special decoding means, and a reproducing apparatus for reproducing such a recording medium.

It is another object of the present invention to provide a recording medium and a reproducing apparatus capable of detecting the letter information directly after disc insertion without imposing excessive loads on the disc producer or on the disc reproducing apparatus.

In one aspect, the present invention provides a disc-shaped recording medium including a program area having recorded thereon at least one type of program information and a management area for managing the program information recorded in the program area, wherein data recorded in the management area is made up of a plurality of frames blocked with a pre-set block length. Each of the frames is made up of a synchronization signal section and a plurality of subcode channels and one of the subcode channels manages the recording position associated with each program information type recorded in the program area and the recording capacity for all programs. The subcode channels other than the aforementioned one of the plural subcode channels are used for managing the letter information associated with each program information type recorded in the program area as text information and for managing an identifier identifying the type of the letter information.

In another aspect, the present invention provides an apparatus for reproducing a disc-shaped recording medium of a type which includes a program area having recorded thereon at least one type of program information and a management area for managing the program information recorded in the program information, wherein data recorded in the management area is made up of a plurality of frames blocked with a pre-set block length, and each of the frames is made up of a synchronization signal section and a plurality of subcode channel data, one of the subcode channel data managing the recording position associated with each program information type recorded in the program area and the recording capacity for all programs, subcode channel data other than the aforementioned one of the plural subcode channel data being used for managing letter information associated with each program information type recorded in the program area as the text information and for managing an identifier identifying the type of the managed letter information. The reproducing apparatus includes read-out means for reading out data from the disc-shaped recording medium, separating means for separating a plurality of the subcode channel data recorded in the management area of the disc-shaped recording medium into the aforementioned one subcode channel data and the other subcode channel data by the read-out means, discrimination means for extracting a mode information contained in the other subcode channel data separated by the separating means for discriminating the type of the recording medium, decoding means for extracting the letter information contained in the other subcode channel data separated by the separating means for decoding, and display means for displaying the decoded letter information from the decoding means.

The present invention provides a recording medium in which only data demarcations are modified using an existing format as a data format, with the mode information being of the same configuration as that of the existing recording medium, and in which modes not assigned to existing modes are defined as the modes in which to record the type information specifying the types of the information recorded on the pack and the text information ancillary to the main data, such that the recording medium may be reproduced by an existing reproducing apparatus having a simplified additional structure. In addition, a large quantity of the letter information can be recorded by employing R to W channels.

By data overwriting, error detection can be done during data readout from the recording medium. By annexing a simplified structure to an existing reproducing apparatus, readout errors may be corrected by re-reading the portion of the recording medium where errors have been found without the necessity of performing complex error correction. If plural recording media are loaded on the reproducing apparatus for reproducing pre-set recording media, the information on the recording medium from which data is currently read out is displayed by letters, the reproducing apparatus can be handled more easily.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 5 shows data of FIG. 4 arrayed vertically for illustrating the subcode.

FIG. 13 is a table showing the types of the identification code shown in FIG. 11.

FIG. 18 shows a data structure for a text block in a pack in case of specifying the size information of FIG. 17.

FIG. 20 shows illustrative program names in case of specifying the program name with an identification code ID1 under mode 4.

DESCRIPTION OF THE PREFERRED EMBODIMENTS

Figure 1:
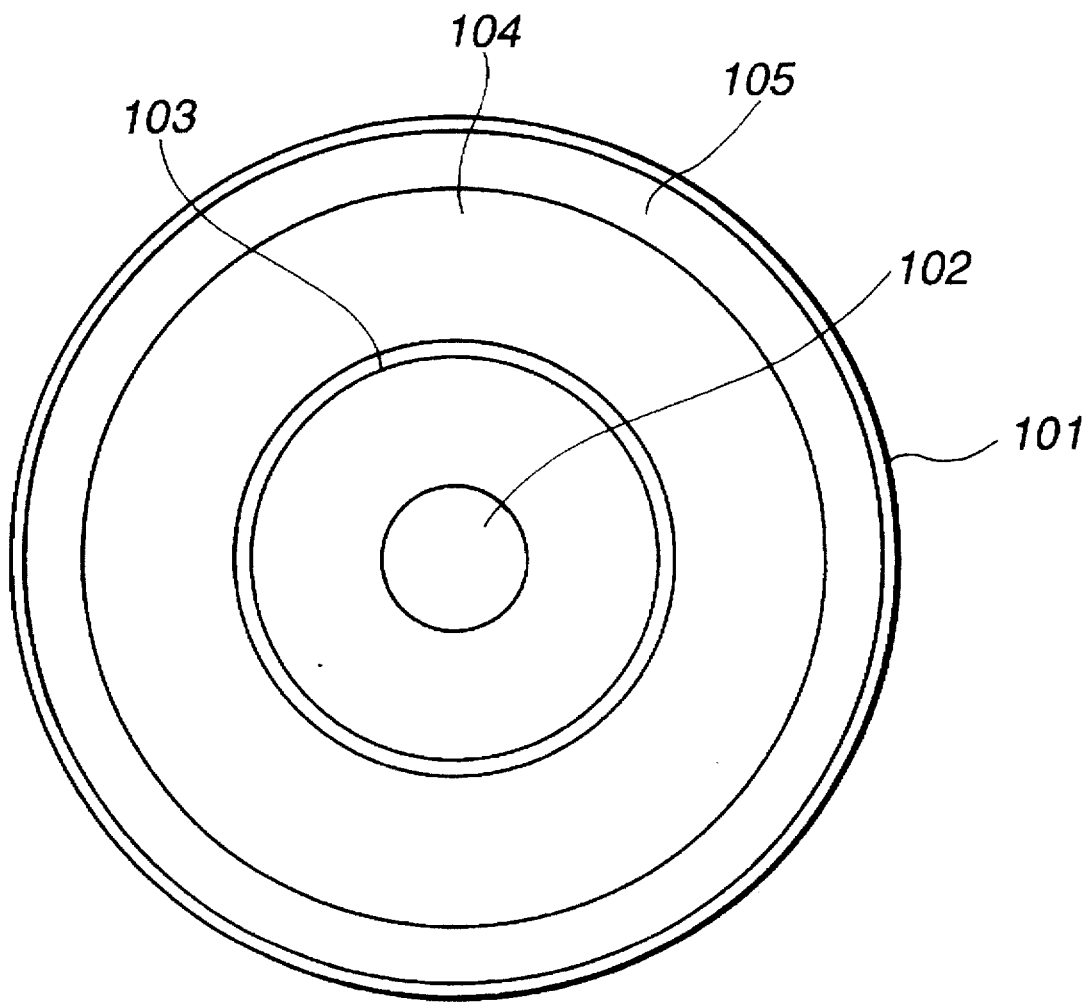
FIG. 1 illustrates a conventional disc-shaped recording medium for audio data.
Figure 2:
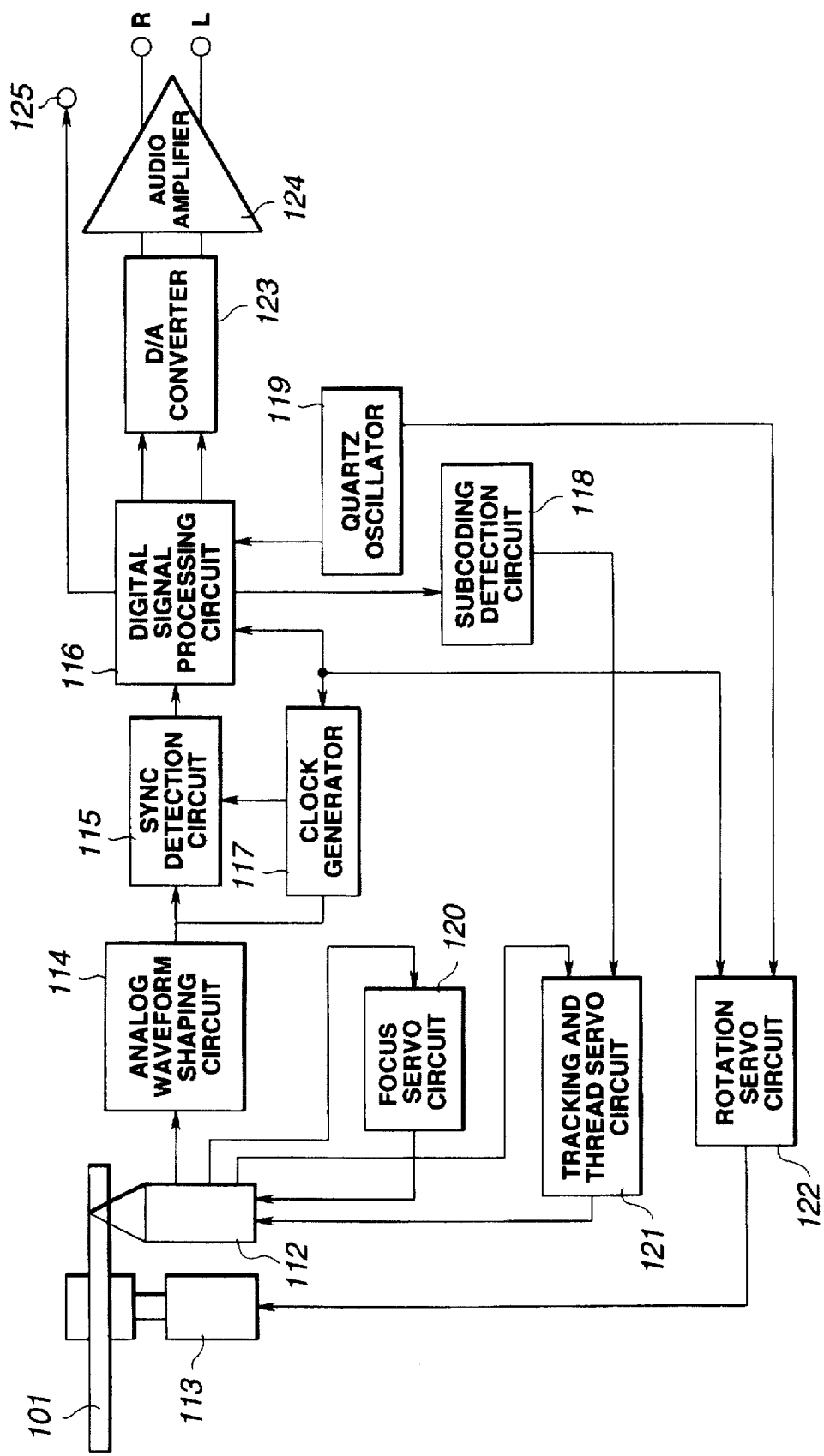
FIG. 2 illustrates a reproducing apparatus for reproducing the conventional disc-shaped recording medium for audio data.
Figure 3:
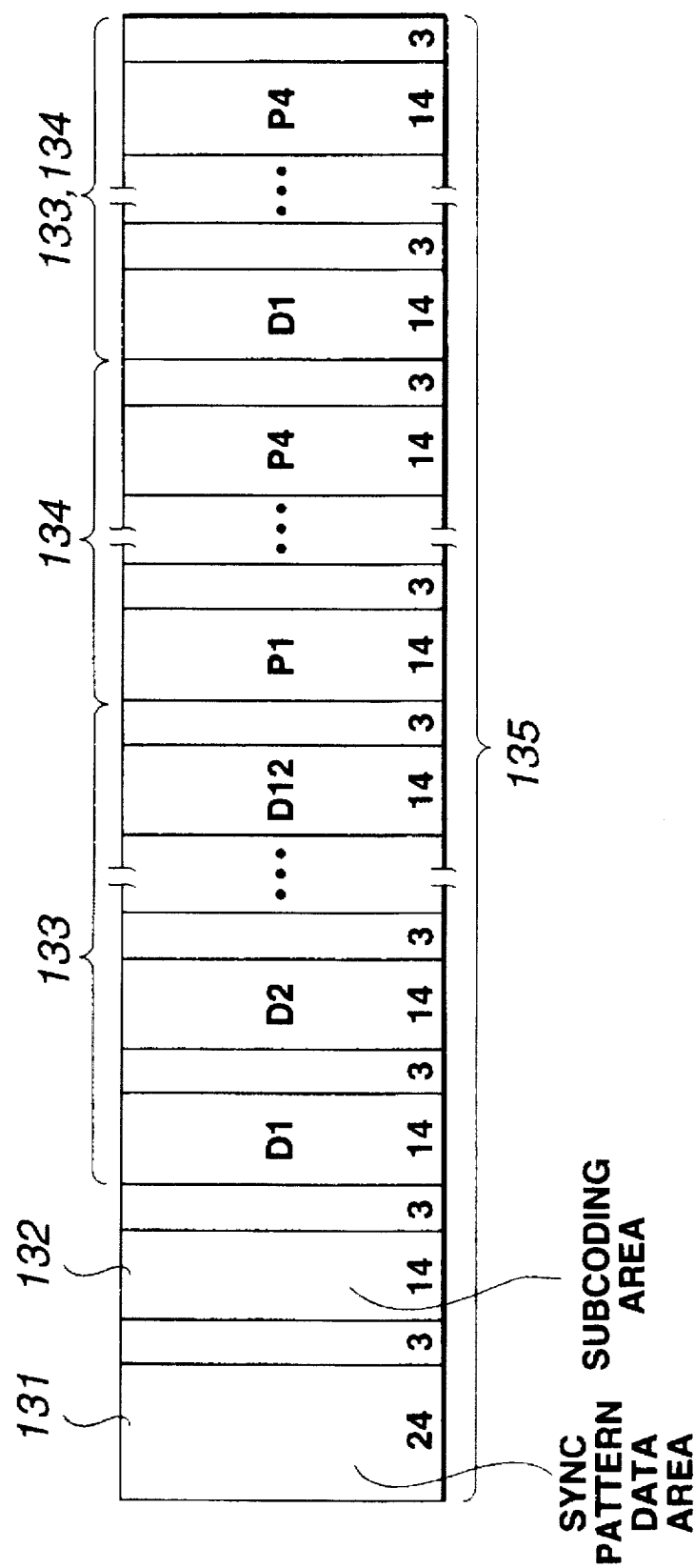
FIG. 3 illustrates a data structure recorded on the conventional disc-shaped recording medium for audio data.
Figure 4:
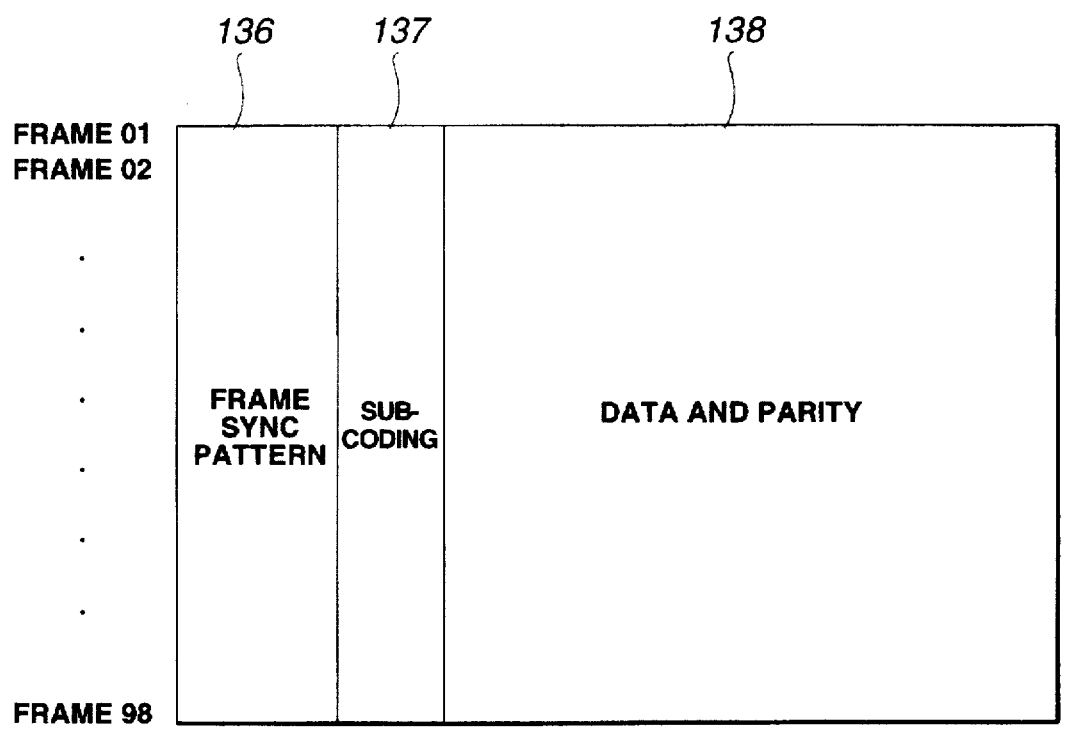
FIG. 4 illustrates 98 of frames of FIG. 3 stacked together to from a block.

Referring to the drawings, illustrative embodiments of a recording medium and a reproducing apparatus according to the present invention will be explained in detail.

The recording medium is an optical disc, as a disc-shaped recording medium, having the above-mentioned subcoding frame in its data structure. In the optical disc, having the sub-code recorded in association with the main data, shown in FIG. 6, data is constructed on the packet basis, each packet being made up of four packs, each pack being made up in turn of 24 6-bit symbols, with the six bits making up each symbol being associated with the subcode channels R to W. At the leading position of each pack is recorded the mode information for setting the recording mode of the information recorded in the pack. Each pack is comprised of a text area 2 for recording the text information obtained on the basis of the letter information ancillary to the main data on the 8-bit basis, and an ID area 1 for recording the type information specifying the types of the text information.

In each pack, there is also recorded data for error correction by cyclic redundancy code (CRC) as 16-bit error correction code.

Before explaining the R to W subcode channels, the data format for recording the graphics information for CD-G (CD graphics) is explained.

Figure 7:
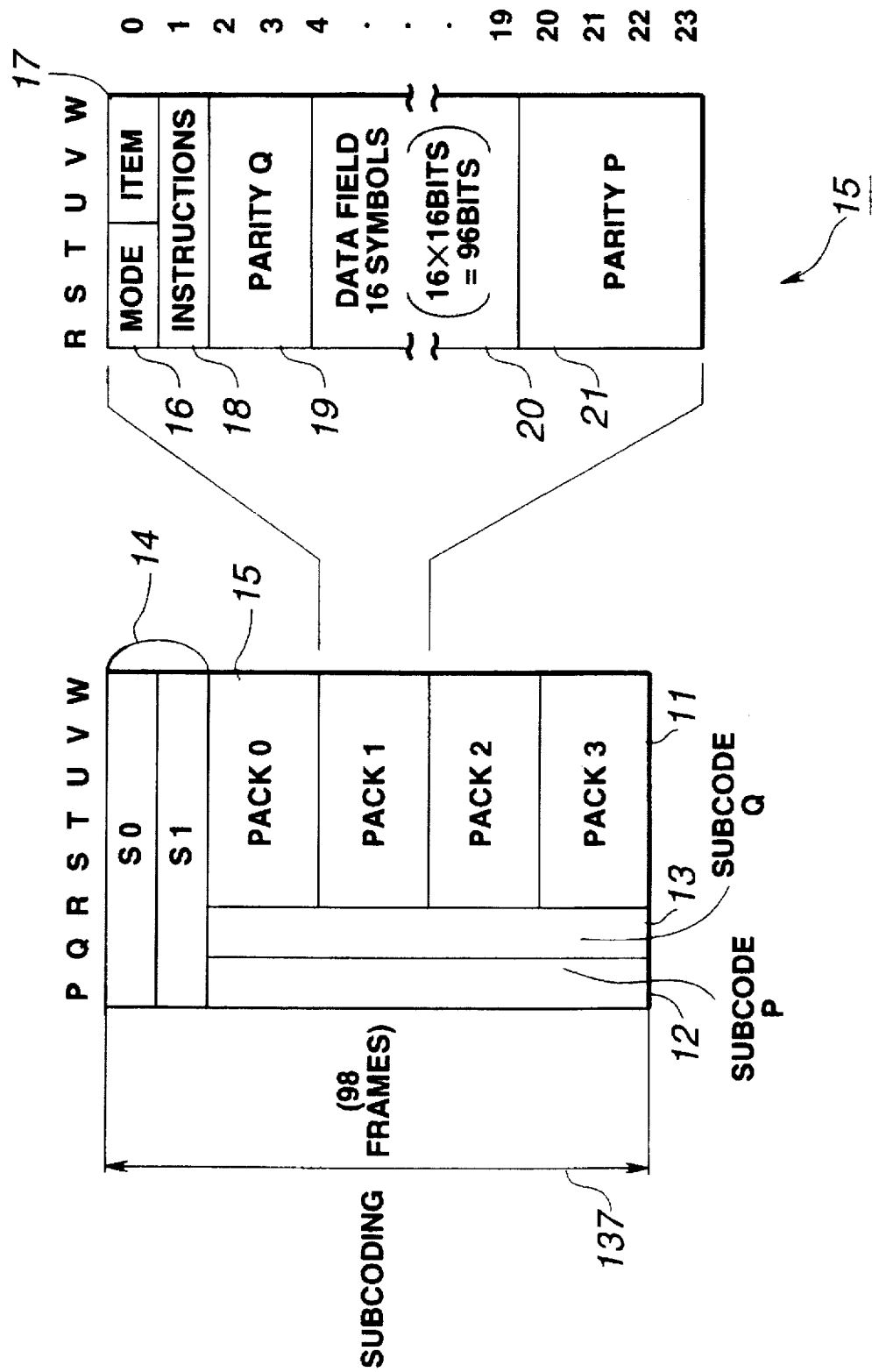
FIG. 7 shows a detailed data structure of the packs of FIG. 6.
Figure 8:
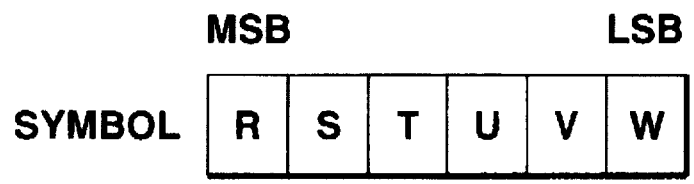
FIG. 8 shows 6 bits of R to W channels to form one symbol.

FIG. 7 schematically shows the structure of a subcoding section 137 shown in FIG. 5.

Each subcode is formed by eight bits, with the group of bits constituting the subcode being divided into eight channels of P, Q, R, S, T, U, V and W. The subcoding section 137 is made up of 98 frames each constituted by channels P to W.

The first two frames are the aforementioned synchronization patterns. The third frame up to the 98th frame are made up of a block 12, termed a subcode P, made up only of P-channel data, a block 13, termed a subcode Q, made up only of Q-channel data, and a block 11 made up only of data from channels R to W.

In a system of recording/reproducing the video information as the subcode, 6 bits of the channels R to W make up one symbol, and the smallest data unit is made up of 24 symbols of from 0 to 23 to form a pack. That is, each block 11 is divided into four packs.

Of the 24 symbols, forming each pack, the first symbol (symbol 0) denotes the mode by three bits from the MSB side, while denoting an item by three bits from the LSB side. This symbol 0, denoting the mode and the item, is followed by a symbol 1 which is an instruction denoting the instruction type. The symbols 3 and 4, following the instruction, are a parity Q, as an error correction code. The symbols 4 to 19, following the parity Q, represent a data field and include e.g., the color information. The symbols 20 to 23, following the data field, are a parity P which is an error correction code for protecting the information in the pack.

There are four modes, namely the zero mode, line graphics mode, TV graphics mode and the user mode.

The zero mode is such a mode in which no operation is done on a display screen, that is a mode for outputting the picture as it is, with the data in the pack being all zero. The line graphics mode is a mode in which a liquid crystal display or the like is provided on the front side of the player for displaying a legend for a musical number. The TV graphics mode is a mode for displaying a picture on a TV screen.

Among video processing commands, there is a command for painting out an entire screen with a certain color, a command for drawing a picture using two sorts of colors for a font on a screen, and a command for shifting the screen in its entirety in the longitudinal or transverse directions. For the graphics display employing the channels R to W, dedicated signal processing is required since data is handled as dot data. This technique is disclosed in, for example, JP Patent Publication Kokai JP-A-58-133689 (1983).

However, a dedicated processing circuit is required for processing data of the channels R to W. In addition, the processing circuit is known to be complex because of the complex method of error correction and detection employing the parities P and Q. Thus the above structure is thought to be inadequate for application in which simply the letter information is recorded or reproduced in or from the subcodes of the channels R to W.

Therefore, a demand is raised for a recording medium of a format in which a processing circuit of a simpler structure suffices for utilizing the channels R to W.

Figure 6:
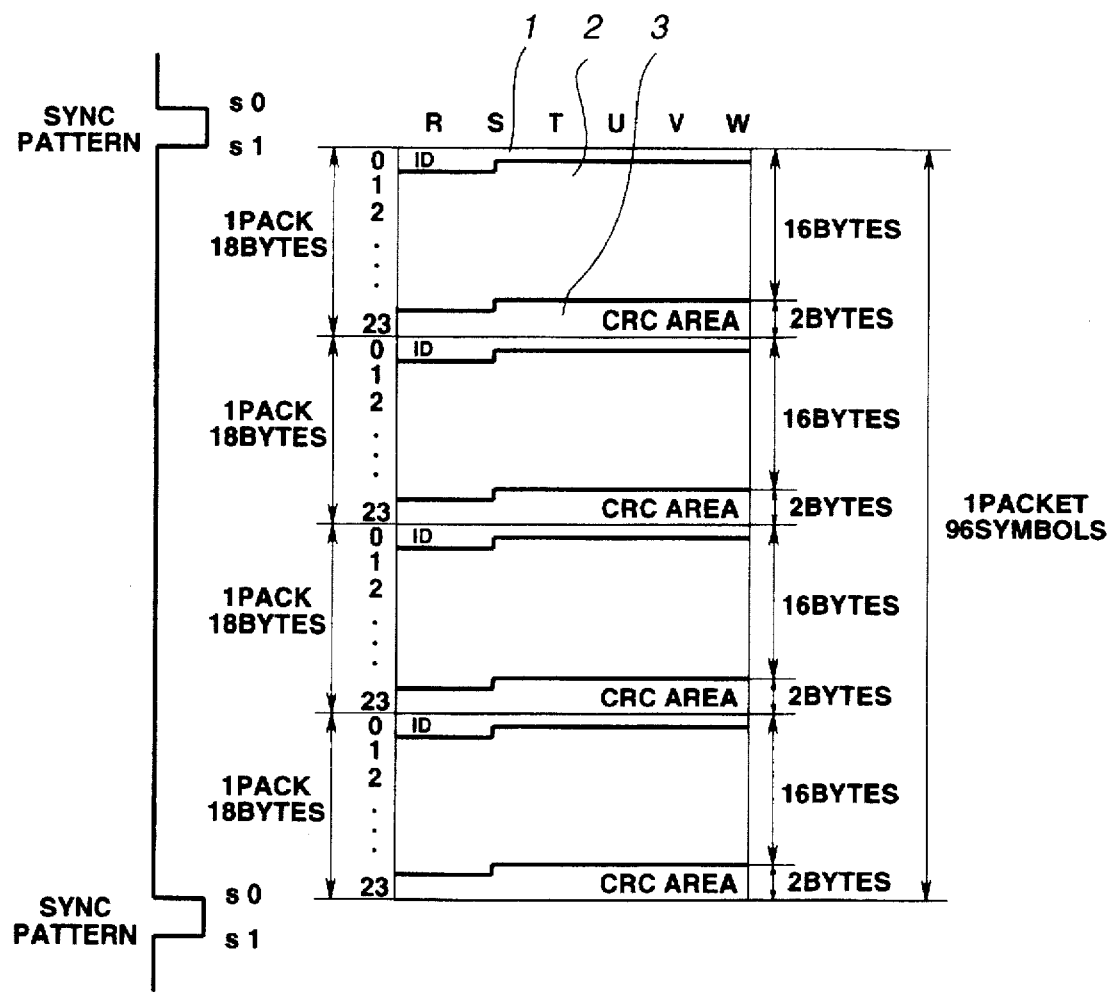
FIG. 6 shows the subcodes R to W in the 98-frame block divided into four packs.
Figure 9:
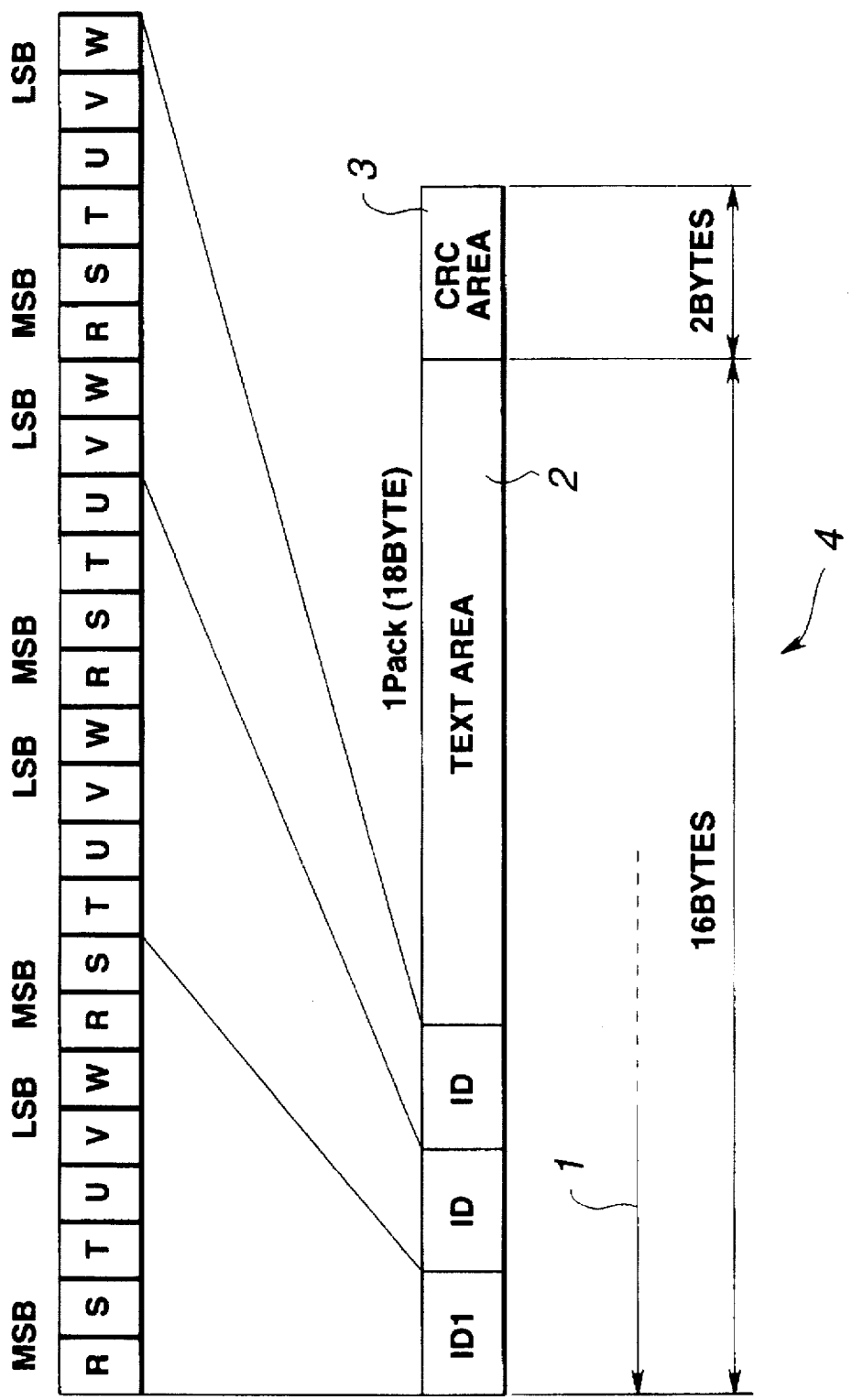
FIG. 9 schematically shows a plurality of symbols of FIG. 8 connected sequentially for handling on the 8-bit basis.

FIG. 9 shows a serially arranged data format shown in FIG. 6.

In FIG. 9, 4-symbol 24-bit data is divided into three 8-bit bytes. If signal processing can be done on the 8-bit basis, processing can be done by a processing method for processing Q-channel signals, so that a processing circuit of a simpler structure suffices.

In the data format shown in FIG. 7, the error correction method employing the parity P and the parity Q is used, whereas, in the data format for the recording medium of the present invention, only error detection is done with the use of the error detection by CRC. If errors are detected, data is again read out. Thus the signal is written in quadruple on a pack basis and is repeatedly written in the packet period from the start of a data string until its end. This eliminates the necessity of using a complex processing circuit for error correction.

However, pack-based multiple recording need not be quadruple recorded and the multiple recording unit need not be a pack unit. For example, multiple recording can be done on the packet basis, or in terms of several packets as a unit.

Figure 10:
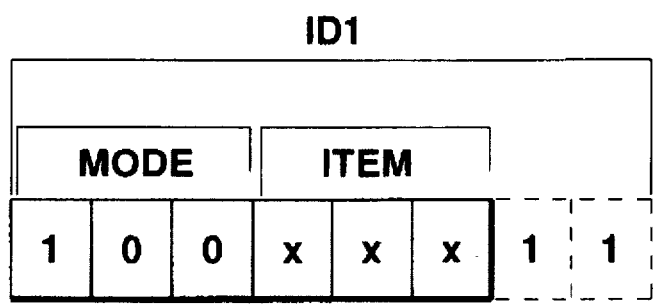
FIG. 10 shows the data structure of an identification code ID1.

The leading type block ID1 of the ID area 1 is made up of 8 bits larger by 2 bits than the usual symbol, as shown in FIG. 10. For preventing malfunctioning of a reproducing apparatus designed for decoding the channels R to W, three bits beginning from the MSB is handled as mode data. With the recording medium of the present invention, the mode represented by these three bits is an undefined code, for example, a mode 4 ("100"). In this case, if the recording medium is loaded on the conventional reproducing apparatus, only an unidentifiable mode is detected, so that the reproducing apparatus merely is halted without malfunctioning. Undefined modes 5 and 6 may also be used in place of the undefined mode 4. For reference, modes 1 and 3 are already used for CD-G (graphics) and for CD-MIDI, respectively.

Figure 11:
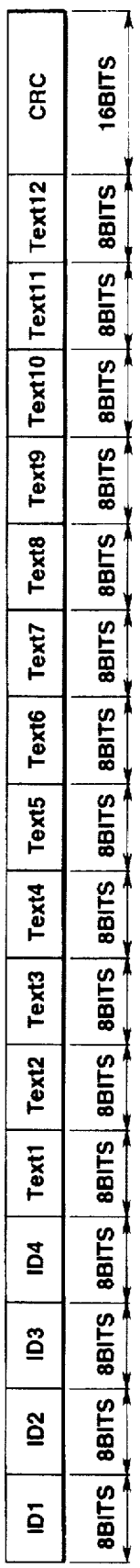
FIG. 11 shows a data structure provided under mode 4.

The data format in the pack for the mode 4 is comprised of type blocks ID1, ID2, ID3 and ID4, each made up of 8 bits, text blocks text1 to text12 and a 12-bit CRC block, as shown in FIG. 11.

Figure 12:
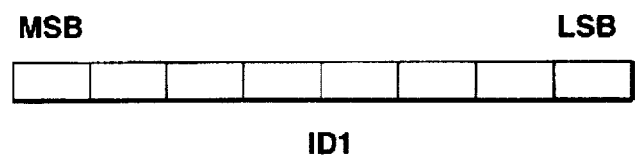
FIG. 12 shows the data structure of the identification code ID1 shown in FIG. 11.

The block ID1 is of an 8-bit structure, as shown in FIG. 12. The data comprised in the pack is classified by the code recorded as shown in Table shown in FIG. 13.

In this figure, "80h" in hexadecimal notation specifies that the pack represents each data size as later explained.

Similarly, "81h" and "82h" specify the disc ID and genre code, respectively, while "83h" and "84h" are reserved for enabling expansion. On the other hand, "85h" denotes the title of an album recorded on a disc and "86h" denotes the title of music of a program. The next series of codes denote, generally, those who could be considered producers of the program, i.e. "87h" denotes the name of artist, "88h" denotes the name of a conductor, "89h" denotes the name of a group or an orchestra. In addition, "Sbh" denotes the name of a composer, "Sch" and "8c" denote the names of songwriters and "8dh" and "Sd" denote the names of arrangers.

The leading numerals in all codes are commonly "8" in hexadecimal notation in order to set "1" at the MSB bit in binary notation. If the code of the ID1 is judged based on three bits beginning from the MSB, the mode can be identified to be the mode 4.

Figure 14:
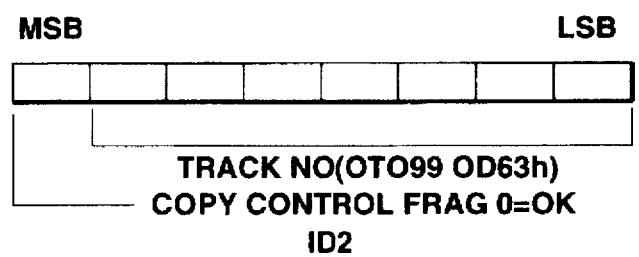
FIG. 14 shows a data structure of an identification code ID2 under mode 4.
Figure 15:
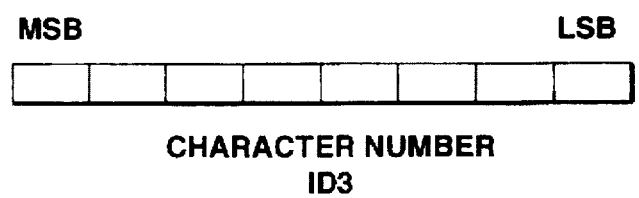
FIG. 15 shows a data structure of an identification code ID3 under mode 4.

The MSB of the block ID2 is a copy control flag, as shown in FIG. 14. The MSB of "0" or "1" indicates copy permit and copy inhibit, respectively. The remaining 7 bits specify the program number (track number). The block number ID3 denotes a number of characters code, as indicated in FIG. 15. If the number of letters is excessive such that a letter exists over plural packs, the forwardly positioned pack denotes the number of pre-recorded letters. This is explained in further detail in FIG. 20.

Figure 16:
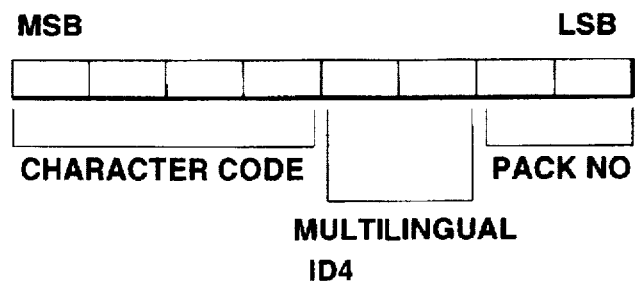
FIG. 16 shows a data structure of an identification code ID4 under mode 4.

As for the block ID4, four bits beginning from the MSB specify a character code, while two bits next following the character code specifies a multilingual code and two bits on the LSB side denotes the pack number, as shown in FIG. 16. If the character code is "0000", it specifies a 1-byte ASCII code, whereas, if it is "0001", it specifies an 8859-1 ASCII code of the same 1-byte code. If the character code is "1000", it specifies an MS-JIS code of the 2-byte code.

As for the two-bit multilingual code, "00", "01", "10" and "11" are defined as being the first, second, third and fourth languages, respectively, as shown in FIG. 11. The languages recorded in text1 to text12 are specified by the recorded two blocks. In text1 to text12, shown in FIG. 11, data concerning the contents shown by ID1 are recorded in character codes and languages specified by ID4.

Figure 17:
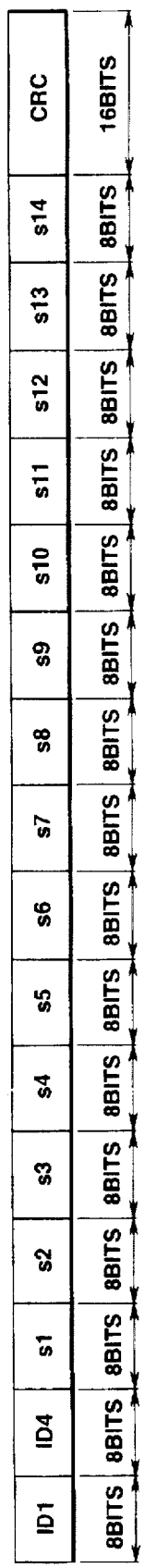
FIG. 17 shows a data structure of an identification code ID1 under mode 4.

An example of the data format of the mode 4 is shown in FIG. 17 as the data structure of a pack whose ID1 is "80h", that is a pack specifying data concerning the size of each information item (size information). Each one pack specifying the size information is provided for each optical disc.

In FIG. 17, the type blocks are only the ID1 and ID4. In 14 blocks of S1 to S14, excluding these type blocks and CRC blocks, totalling 112 bits, data specifying something like a recording map for data recorded on an optical disc are recorded, as shown in FIG. 18.

That is, blocks s1 and s2 are constituted by two blocks, two MS side bits, that is two bits towards the block s1, are reserved, while the two succeeding bits specify a multilingual code. The remaining 12 bits specify the total number of packs (total pack number). That is, the total number of packs is 4096 at the maximum.

The block s3 specifies the total number of packs used for data of the album titles (total pack number of music title), while the block s4 specifies the total number of packs used for data of the program titles.

The block s5 specifies the total number of packs used for the artist's name (total pack number of artist's name), the block s6 specifies the total number of packs used for the conductor's name (total pack number of conductor's name), and the block s7 denotes the total number of packs used for the artist's name or orchestra's name (total pack number of group's name).

The block s8 specifies the total number of packs used for the composer's name (total pack number of composer's name), while the block s9 specifies the total number of packs used for the songwriter's name (total pack number of songwriter's name). The block s10 specifies the total number of packs used for the arranger's name (total pack number of arranger's name), while the block s11 specifies the total number of packs used for the disc ID (total pack number of disc ID).

The blocks s12 and s13 specify the total numbers of packs used for data corresponding to "83h" and "84h" of the ID1 (total pack number of ID=83h, total pack number of ID=84h). That is, three blocks prescribe the amount of data for a portion reserved for extension. Finally, the block s14 is a simply reserved block.

Figure 19:
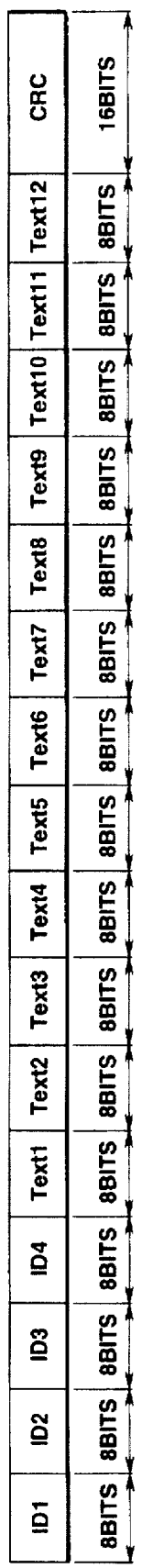
FIG. 19 shows a data structure in a pack in case of specifying the program name with an identification code ID1 under mode 4.

FIG. 19 shows, as another example of the data format of the mode 4, the data structure of a pack whose ID1 is "86h", that is a pack specifying the name (title of music) from program to program.

Referring to FIG. 19, the type information is recorded in blocks ID1, ID2, ID3 and ID4, while the text information is recorded from text block text1 to text block text 12. A CRC block is provided at the trailing end.

A track overhead is first defined. The track overhead is made up of two text blocks, that is two-byte data, termed text1 and text2. The track overhead is provided at the leading end of the text information of each track.

In Text1, there is recorded the genre code in a binary code, while in Text2, there is recorded the program number.

The text block next following the track overhead is Text3, the information of each program begins from Text3 and a text block of the zero code (null code) is inserted at the trailing end. If two character codes are used for the text block, two zero codes are ultimately arrayed. Thus the track overhead is provided next to the null code track block in such an area where there is provided the next program.

FIG. 20 shows an example of the above-described data structure.

In this figure, program titles are recorded in the program sequence, specifically, the first program title "BAD", the second program title "THE WAY YOU MAKE ME FEEL", the third program title "SPEED DEMON" and the fourth program title "LIBERIAN" and so forth, are recorded in this order.

Between the programs is recorded, as the above text overhead, a text block corresponding to Text1, beginning from "17h". Next to "17h", there is provided a text block Text2 having recorded thereon data specifying the program sequence. For specifying the first program, "01h" is recorded in Text2. At the trailing end of each track, there is provided a text block having "00h" recorded therein.

Referring to FIG. 20, there is included in ID1 an identification code specifying the program title for each program corresponding to the title of music "86h", while "01h" is included in ID2. The upper four bits, which are zero, specify copy permit, while the lower four bits, which are 1, specify that the next following TEXT data corresponds to the first program.

There is recorded "00h" in ID3, specifying that the letter information recorded in this pack 0 corresponds to the leading end of a letter.

There is recorded "00h" in ID4. The upper four bits, which are 0, specify the ASCII code, while the upper two of the lower four bits, which two bits are 0, specify that the next following TEXT data is the language 1, and the lower two of the lower four bits, which two bits are 0, specify that the PACK number is 0.

There is recorded "17h" in TEXT1, specifying the leading end of the text, while there is recorded "01h" in TEXT2, specifying that the next following TEXT data corresponds to the first program.

In TEXT 3 to TEXT5, there is recorded an ASCII code corresponding to "BAD", while, in TEXT6, there is recorded "00h" specifying the end of the program title.

There is recorded "17h" in TEXT7, specifying the leading end of the program title recorded in the second place, while there is recorded "02h" in TEXT8 specifying that the next following TEXT data corresponds to the second program.

In TEXT9 to TEXT12, there is recorded text data corresponding to the second music number as the ASCII code. In the present embodiment, the leading word "THE" of "THE WAY YOU MAKE ME FEEL" is recorded. For SP of TEXT12, the ASCII code specifying a space is recorded.

The title of the second music number is made up of as many as 24 letters which cannot be accommodated in TEXT9 to TEXT12, so that the next pack is used.

The 2-byte CRC code is then annexed.

The identification code specifying the program title for each program corresponding to the title of music "86h" as ID1 is included in the leading end of the next pack, while "02h" is recorded in ID2. The upper four bits, which are 0, specify copy permit, whereas the lower four bits, which are 2, specify that the next following TEXT data corresponds to the second program.

There is recorded "04h" in ID3, specifying that four letters, namely three letters "THE" and a space, have already been recorded in the pack 0.

There is recorded "01h" in ID4. The upper four bits, which are 0, indicate the ASCII code, while the lower two of the lower four bits, which are 1, specify that the PACK number is 1.

In TEXT1 to TEXT12, "WAY YOU MAKE", which have not been accommodated in pack number 0, is recorded.

In the pack number 2, an identification code, indicating the program title of each program corresponding to the title of music "86h" is recorded as ID1 at the leading end. In ID2, "02h" is recorded, of which the upper four bits, which are 0, indicate copy permit, whereas the lower four bits, which are 2, specify that the next following text data correspond to the second program.

There is recorded "10h" in ID3, specifying that 16 letters and spaces of "THE WAY YOU MAKE" have already been recorded in the packs 0 and 1.

There is recorded "02h" in ID4, of which the upper four bits, which are 0, indicate the ASCII code, and the upper two of the lower four bits, which are 2, specify that the PACK number is 2.

In TEXT1 to TEXT8, "ME FEEL", which have not been accommodated in pack number 1, is recorded.

In TEXT9, "00h", indicating the end of the program title, is recorded.

There is recorded "17h" in TEXT10, indicating the leading end of the program title recorded in the third place, while there is recorded "03h" in TEXT11 specifying that the next following TEXT data corresponds to the third program. There is recorded in TEXT12 the ASCII code corresponding to "S" which is the leading letter of "SPEED DEMON" of the third program title. The 2-byte CRC code is then recorded.

In the leading end of the pack number 3, an identification code indicating the program title for each program corresponding to the title of music of "86h" as ID1, while "03h" is recorded in ID2, of which the upper four bits, which are 0, indicate copy permit, and of which the lower four bits, which are 3, specify that the next following TEXT data is the subtitle corresponding to the third program.

There is recorded "01h" in ID3, specifying that a letter "S" has already been recorded in the pack 1.

There is recorded "03h" in ID4, of which the upper four bits, which are 0, indicate the ASCII code, and the upper two of the lower four bits, which are 0, specify that the next following TEXT data is language 1, while the lower two of the lower four bits, which are 3, specify that the PACK number is 3.

In TEXT1 to TEXT10, "PEED DEMON", which have not been accommodated in pack number 2, is recorded.

In TEXT11, "00h", indicating the end of the program title, is recorded.

There is recorded "17h" in TEXT12, indicating the leading end of the program title recorded in the fourth place.

Two bytes of the CRC code are then appended.

The above four packs complete one packet.

In the leading end of the pack number 0 of the next following packet, there is similarly recorded an identification code indicating the program title for each program corresponding to the title of music of "86h" as ID1, while there is recorded "04h" in ID2, of which the upper four bits, which are 0, indicate copy permit, while the lower four bits, which are 4, specify that the next following TEXT data is the title corresponding to the fourth program.

There is recorded "00h" in ID4, of which the upper four bits, which are 0, indicate the ASCII code. The upper two of the lower four bits, which are 0, specify that the next following TEXT data is of a language 1, while the lower two of the lower four bits, which are 0, specify that the PACK number is 0.

In TEXT1 to TEXT9, "LIBERIAN", which has not been accommodated in the pack number 2, is recorded.

The description on TEXT10 and so forth is omitted for simplicity.

The information on other letters is recorded in the same way as the information on the program titles of the respective programs.

Figure 21:
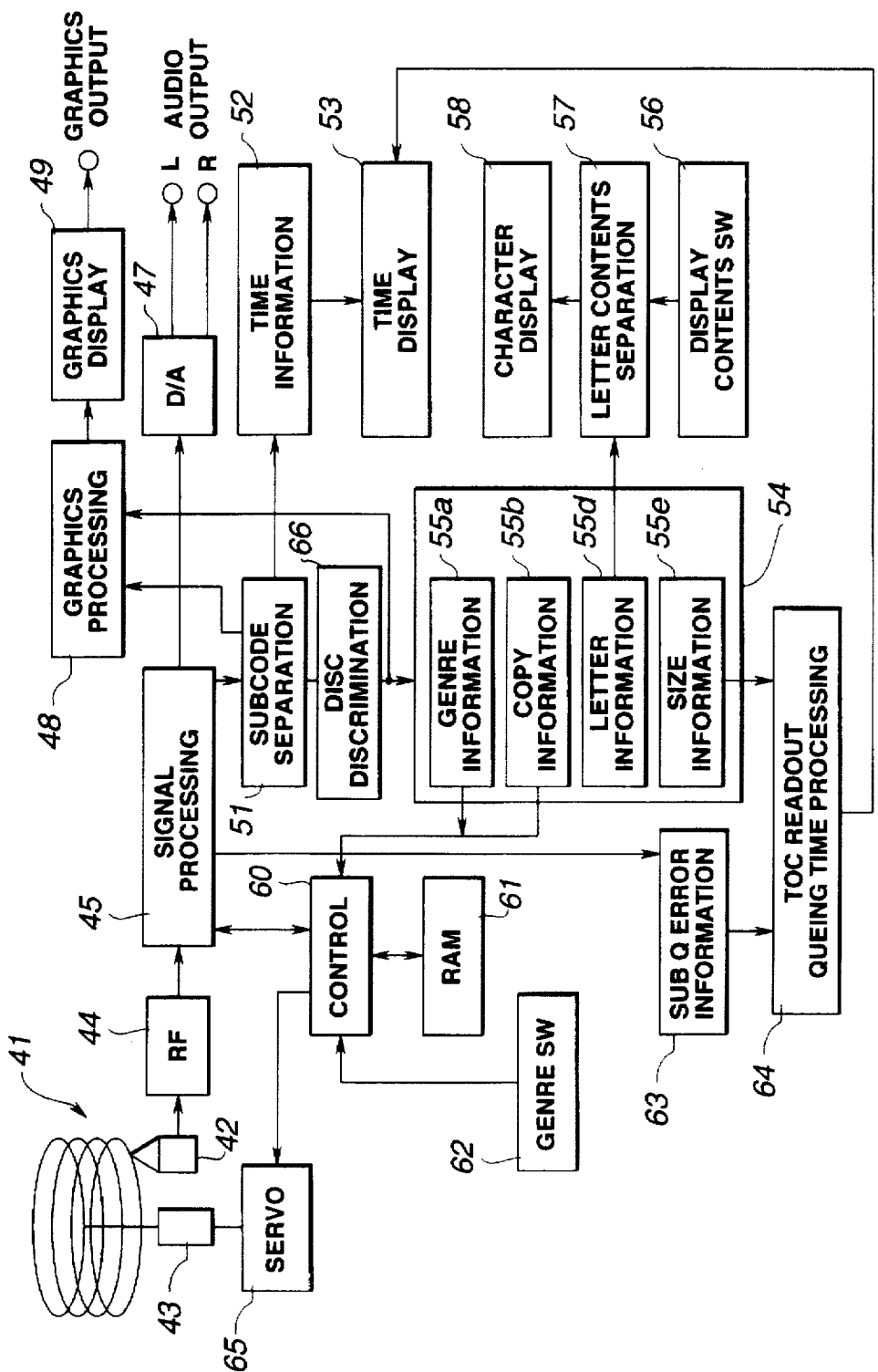
FIG. 21 is a block diagram showing a reproducing apparatus for reproducing a disc-shaped recording medium according to the present invention.

Referring to FIG. 21, a reproducing apparatus for reproducing a recording medium according to the present invention, is such an apparatus designed to reproduce a recording medium in which 24 symbols, each made up of six bits corresponding to R to W channels of the subcode recorded in association with the main data, are grouped together as one pack, four packs are grouped together as one packet, data is constructed on the packet basis, the mode information for setting the recording mode of the information recorded in the pack is recorded at the leading end of each pack and the information recorded in each pack is 8-bit based type information and 8-bit based text information. The reproducing apparatus includes an optical pickup 42 for reading out the recording medium, a signal processing circuit 45 for taking out the subcode from the signal read out from the optical pickup 42 and a subcode separation circuit 51 for separating the subcode taken out by the signal processing circuit 45 into the Q-channel and into R to W channels. The reproducing apparatus also includes a disc discrimination circuit 66 for taking out the mode information of the subcode of the R to W channels separated by the subcode separation circuit 51 and for discriminating the type of the recording medium based on this mode information, a subcode processing circuit 54 for processing the subcodes of the R to W channels sent from the subcode separation circuit 51 and a character display unit 58 for displaying the character information of the information processed by the subcode processing circuit 54.

Referring to FIG. 21, a desired one of plural optical discs 41, such as CDs, may be selected and reproduced by the auto-changer function. The optical disc 41, selected by this auto-changer function, is rotated by a spindle motor 43, so that its recording contents are optically read out by the optical pickup 42. The signals from the optical pickup 42 are sent via an optical signal processing circuit 44 to a digital signal processing circuit 45. The digital audio signal components output from the digital signal processing circuit 45 are converted by a digital/analog (D/A) converter 47 into analog audio signals which are taken out at an analog audio signal output terminal.

In the digital signal processing circuit 45, the above-mentioned subcode is taken out and outputted to the subcode separation circuit 51.

The subcode taken out from the digital signal processing circuit 45 is separated by the subcode separation circuit 51 into the Q-channel sent to the time information processing circuit 52 and into R to W channels sent to the subcode processing circuit 54 and to a disc discrimination circuit 66.

The time information processing circuit 52 sends the time information managed by the Q-channel to a time display unit 53 for time display.

The disc discrimination circuit 66 takes out the mode information written in the R to W channels and discriminates whether or not the inserted optical disc is such an optical disc in the R to W channels of which have been recorded the type information and the text information. If the optical disc has been found to be such an optical disc in the R to W channels of which have been recorded the type information and the text information, the disc discrimination circuit 66 outputs an operation input signal to the subcode processing circuit 54. If the optical disc is other than the above-mentioned optical disc, and is such an optical disc in the R to W channels of which has been recorded the graphic information, the disc discrimination circuit 66 outputs an operation input signal to the graphics processing circuit 48.

If the subcode processing circuit 54 is supplied with an operation input signal from the disc discrimination circuit 66, that is if the loaded optical disc is such an optical disc in the R to W channels of which have been recorded the type information and the text information, the subcode processing circuit 54 outputs the information of respective items, obtained on processing the R to W channels from the subcode separation circuit 51 based on pre-set conversion codes, such as the above-mentioned ASCII codes. Such information, obtained on processing the R to W channels, may be exemplified by the genre information 55a, disc ID information 55b, letter information 55d, such as titles of album or artist, or the size information 55e.

The letter information 55d, separated from the subcode processing circuit 54, is sent to a letter contents separation circuit 57 for selectively separating display items or contents responsive to the operation of the display contents switch 56. The separated data is sent to the character display unit 58 for display.

The genre information 55a, separated by the subcode processing circuit 54, is sent to a control circuit 60 employing a so-called CPU which then manages control for reproducing only the musical number or disc of the genre designated by the user. To this control circuit 60 is connected a semiconductor memory, such as RAM 61, so that the genre information designated by the user pressing a genre switch 62 is stored in the RAM 61. The control circuit then discriminates whether or not the designated genre information coincides with the genre information 55a from the subcode processing circuit 54. If the result indicates coincidence, the control circuit controls the servo circuit 65 for reproducing the disc. In an auto-changer type, only the disc indicating such genre coincidence is reproduced, while the discs are automatically changed, so that only the disc of a pre-set genre may be selectively reproduced.

The disc ID information, e.g copy information, from the subcode processing circuit 54 is sent to the control circuit 60 where it is used to realize the operation of the auto-changer efficiently.

The disc size information 55e from the subcode processing circuit 54 is sent to a TOC readout queue time processing circuit 64. This TOC readout queue time processing circuit 64 calculates the time needed to read out all of the R to W channels, that is the queue time, based on the sub-Q error information 63 specifying whether or not the Q-channel data has been regularly read out by the signal processing circuit 45 and on the size information 55e, and sends the calculated queue time to the time display unit 53. This queue time may be displayed on a character display unit 58. The sub-Q error information circuit is supplied with subcode information from the digital signal processing circuit 45.

If the operation input signal is sent from the disc discrimination circuit 66 to the graphics processing circuit 48, that is if the loaded optical disc has recorded thereon the graphics code inclusive of the above-mentioned picture information and the letter code having pre-set dot pattern associated with letters, the graphics processing circuit 48 processes the graphics code and the letter code in a pre-set manner for producing display data.

The graphics display circuit 49 displays the data on a display screen, based on display data from the graphics processing circuit 48, and outputs this display data from the graphics output terminal, based on the display data from the graphics processing circuit 48.

Although the present invention has been shown and described with respect to the preferred embodiments, various changes and modifications are deemed to lie within the spirit and scope of the invention as claimed.

What is claimed is:

1. A disc-shaped recording medium comprising:

a program area having recorded thereon at least one type of program information; and a management area for managing the program information recorded in the program area, wherein data recorded in the management area made up of a plurality of frames blocked with a pre-set block length;

each of the frames being made up of a synchronization signal section and a plurality of subcode channels;

wherein one of the subcode channels manages a recording position on the recording medium associated with each type of program information recorded in the program area and a recording capacity for all programs;

wherein subcode channels, other than the one of the plural subcode channels, are used for managing letter information associated with each program information type recorded in the program area as text information and for managing an identifier identifying a type of letter information; and wherein the identifier identifying the type of the letter information is a code capable of identifying at least one of a title of the program information recorded in the program area, a classification of the program information recorded in the program area, and a name of a producer.

2. The disc-shaped recording medium as claimed in claim 1 wherein subcode channels other than the one of the plural subcode channels of the management area further manage an identifier determining whether or not the letter information associated with each program information type recorded in the program area can be copied on another recording medium.

3. The disc-shaped recording medium as claimed in claim 1 wherein subcode channels other than the one of the plural subcode channels of the management area further manage an identifier for identifying a conversion code format of the letter information associated with each program information type recorded in the program area.

4. The disc-shaped recording medium as claimed in claim 1 wherein the subcode channels other than the one of the plural subcode channels of the management area further manage an identifier for identifying the number of letter types contained in the letter information associated with each program information type recorded in the program area.

5. The disc-shaped recording medium as claimed in claim 1 wherein subcode channels other than the one of the plural subcode channels of the management area further manage a mode information for discriminating whether the letter information associated with each program information type recorded in the program area is at least one of TEXT data and graphics data.

6. The disc-shaped recording medium as claimed in claim 1 further comprising a plurality of identifiers for identifying the type of the letter information the plurality of identifiers including at least three of the following codes:

a code capable of identifying at least one of a title of the program information recorded in the program area, a classification of the program information recorded in the program area, and a name of a producer;

a code determining whether or not the letter information associated with each program information type recorded in the program area can be copied on another recording medium;

a code identifying a conversion code format of the letter information associated with each program information type recorded in the program area; a code identifying the number of letter types contained in the letter information associated with each program information type recorded in the program area; and a code for discriminating whether the letter information associated with each program information type recorded in the program area is at least one of TEXT data and graphics data.

7. The disc-shaped recording medium as claimed in claim 1 wherein the one of the subcode channels is the Q channel and the other of the subcode channels are the R-W subcode channels.

8. In combination, a disc-shaped recording medium and an apparatus for reproducing the disc-shaped recording medium, comprising:

a disc-shaped recording medium which includes:

a program area having recorded thereon at least one type of program information and a management area for managing the program information recorded in the program area;

data recorded in the management area being made up of a plurality of frames blocked with a pre-set block length, each of the frames being made up of a synchronization signal section and a plurality of subcode channel data;

one of the subcode channel data managing a recording position associated with each program information type recorded in the program area and a recording capacity for all programs;

subcode channel data, other than the one of the plural subcode channel data, being used for managing letter (TEXT) information associated with each program information type recorded in the program area as text information and for managing an identifier identifying the type of the managed letter information; a reproducing apparatus which includes:

read-out means for reading out data from the disc-shaped recording medium;

separating means for separating a plurality of the subcode channel data recorded in the management area of the disc-shaped recording medium into the one subcode channel data and the other subcode channel data by the read-out means;

discrimination means for extracting mode information contained in the other subcode channel data separated by the separating means for discriminating a type of the recording medium;

first decoding means for decoding the letter information contained in the other subcode channel data separated by the separating means for decoding; and display means for displaying the decoded letter information from the decoding means.

9. The combination as claimed in claim 8 wherein the identifier identifying the type of the letter information is a code capable of identifying at least one of a title of the program information recorded in the program area, a classification of the program information recorded in the program area and a name of the producer.

10. The combination as claimed in claim 8 wherein subcode channels other than the one of the plural subcode channels of the management area further manage an identifier determining whether or not the letter information associated with each program information type recorded in the program area can be copied on another recording medium.

11. The combination as claimed in claim 8 wherein subcode channels other than the one of the plural subcode channels of the management area further manage an identifier for identifying a conversion code format of the letter information associated with each program information type recorded in the program area.

12. The combination as claimed in claim 8 wherein subcode channels other than the one of the plural subcode channels of the management area further manage an identifier identifying the number of letter types contained in the letter information associated with each program information type recorded in the program area.

13. The combination as claimed in claim 8 wherein the subcode channel data, other than the one of the plural subcode channel data, is used for managing DOT (graphics) information associated with each program information type recorded in the program area and further manage the mode information for discriminating whether the letter information associated with each program information type recorded in the program area is TEXT data or graphics data;

the reproducing apparatus further comprises:

second decoding means for decoding the graphics information contained in the other subcode channel data separated by the separating means for decoding; and switching means for switching operation between the first decoding means and the second decoding means responsive to the type of the disc-shaped recording medium discriminated by the discrimination means.

14. An apparatus for reproducing a disc-shaped recording medium of the type including a program area having recorded thereon at least one type of program information and a management area for managing the program information recorded in the program area, data recorded in the management area being made up of a plurality of frames blocked with a preset block length, each of the frames being made up of a synchronization signal section and a plurality of subcode channel data, one of the subcode channel data managing a recording position associated with each program information type recorded in the program area and a recording capacity for all programs, subcode channel data, other than the one of the plural subcode channel data, being used for managing letter information associated with each program information type recorded in the program area as text information and for managing an identifier identifying the type of the managed letter information; the apparatus comprising:

read-out means for reading out data from the disc-shaped recording medium;

separating means for separating a plurality of the subcode channel data recorded in the management area of the disc-shaped recording medium into the one subcode channel data and the other subcode channel data by the read-out means;

discrimination means for extracting mode information contained in the other subcode channel data separated by the separating means for discriminating a type of the recording medium;

first decoding means for extracting the letter information contained in the other subcode channel data separated by the separating means for decoding;

second decoding means for extracting graphics information contained in the other subcode channel data separated by the separating means for decoding;

switching means for switching the decoding between the first decoding means and the second decoding means responsive to a type of the disc-shaped recording medium discriminated by the discrimination means; and display means for displaying the decoded letter information from the decoding means.

15. A disc-shaped recording medium comprising:

a program area having recorded thereon at least one type of program information; and a management area for managing the program information recorded in the program area, with data recorded in the management area being made up of a plurality of frames blocked with a pre-set block length, each of the frames being made up of a synchronization signal section and a plurality of subcode channels, wherein:

one of the subcode channels manages a recording position on the recording medium associated with each type of program information recorded in the program area and a recording capacity for all programs;

subcode channels other than the one of the plurality of subcode channels are used for managing character information associated with each program information type recorded in the program area as text information and for managing an identifier identifying a type of the character information; and wherein the identifier identifying the type of the character information is a code capable of identifying at least one of a title of the program information recorded in the program area, a classification of the program information recorded in the program area, and a name of a producer.

16. In combination, a disc-shaped recording medium and an apparatus for reproducing the disc-shaped recording medium, comprising:

(a) a disc-shaped recording medium which includes:

a program area having recorded thereon at least one type of program information and a management area for managing the program information recorded in the program area;

data recorded in the management area and which are made up of a plurality of frames blocked with a pre-set block length, each of the frames being made up of a synchronization signal section and a plurality of subcode channel data, one of the plurality of subcode channel data managing a recording position associated with each program information type recorded in the program area and a recording capacity for all programs and subcode channel data other than the one of the plurality of subcode channels being used for managing character information associated with each program information type recorded in the program area as text information and for managing an identifier identifying the type of the managed character information;

(b) a reproducing apparatus which includes:

read-out means for reading out data from the disc-shaped recording medium;

separating means for separating a plurality of the subcode channel data recorded in the management area of the disc-shaped recording medium into the one subcode channel data and the other subcode channel data by the read-out means;

discrimination means for extracting mode information contained in the other subcode channel data separated by the separating means for discriminating a type of the recording medium;

decoding means for extracting the character information contained in the other subcode channel data separated by the separating means for decoding; and display means for displaying the decoded character information from the decoding means.

17. The combination as claimed in claim 16, wherein management area of the disc-shaped recording medium is recorded with a plurality of identifiers for identifying the type of the character information, the plurality of identifiers including at least three of the following codes:

a code determining whether or not the character information associated with each program information type recorded in the program area can be copied on another recording medium;

a code identifying a conversion code format of the character information associated with each program information type recorded in the program area;

a code identifying the number of character types contained in the character information associated with each program information type recorded in the program area;

a code for discriminating whether the character information associated with each program information type recorded in the program area is TEXT data or graphics data.

18. The combination as claimed in claim 16 wherein the one of the subcode channels is the Q channel and the other of the subcode channels are the R-W subcode channels.

19. A method of reproducing a disc-shaped recording medium, the reproducing method comprising the steps of:

(a) reading out data from the disc-shaped recording medium having a program area in which at least one type of program information is recorded and a management area for managing the program information recorded in the program area, the data recorded in the management area being made up of a plurality of frames blocked with a preset block length, each of the frames being made up of a synchronization signal section and a plurality of subcode channel data, one of the plurality of subcode channel data managing a recording position associated with each program information type recorded in the program area and a recording capacity for all programs and subcode channel data other than the one of the plurality of subcode channels being used for managing character information associated with each program information type recorded in the program area as text information and for managing an identifier identifying the type of the managed character information;

(b) separating a plurality of the subcode channel data recorded in the management area of the disc-shaped recording medium into the one subcode channel data and the other subcode channel data, wherein the other subcode channel data includes a plurality of identifiers;

(c) extracting mode information contained in the other subcode channel data separated in step (b) for discriminating a type of the recording medium;

(d) subcode processing the other data subcode channel data to detect a code for discriminating whether the character information associated with each program information type recorded in the program area is TEXT data or graphics data;

(e) decoding the character information contained in the other subcode channel data separated by the separating step (b); and (f) displaying the decoded character information.

20. The method of reproducing a disc-shaped recording medium as claimed in claim 19, further comprising a step of subcode processing the other subcode channel data in response to the discrimination of the type of the recording medium in step (c), the step of subcode processing including detecting at least three of the following codes and controlling the step of displaying the decoded character information in step (e) in response to the detected codes:

a code capable of identifying at least one of a title of the program information recorded in the program area, a classification of the program information recorded in the program area, and a name of a producer;

a code determining whether or not the character information associated with each program information type recorded in the program area can be copied on another recording medium;

a code identifying a conversion code format of the character information associated with each program information type recorded in the program area; and a code identifying the number of character types contained in the character information associated with each program information type recorded in the program area.

* * * * *